United States Patent
Chaudhari et al.

(10) Patent No.: US 7,472,062 B2
(45) Date of Patent: Dec. 30, 2008

(54) EFFICIENT RECURSIVE CLUSTERING BASED ON A SPLITTING FUNCTION DERIVED FROM SUCCESSIVE EIGEN-DECOMPOSITIONS

(75) Inventors: Upendra V. Chaudhari, Briarcliff Manor, NY (US); Jiri Navratil, White Plains, NY (US); Ganesh N. Ramaswamy, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 10/042,827

(22) Filed: Jan. 4, 2002

(65) Prior Publication Data

US 2003/0158853 A1 Aug. 21, 2003

(51) Int. Cl.
*G10L 15/06* (2006.01)
(52) U.S. Cl. ............... 704/245; 704/240; 704/249; 704/255; 704/272
(58) Field of Classification Search ........... 704/245, 704/243, 246, 240, 249, 255, 272; 382/170; 707/6; 700/382
See application file for complete search history.

(56) References Cited

U.S. PATENT DOCUMENTS

| | | | | |
|---|---|---|---|---|
| 5,263,120 A | * | 11/1993 | Bickel | 706/62 |
| 5,659,662 A | * | 8/1997 | Wilcox et al. | 704/245 |
| 5,710,833 A | * | 1/1998 | Moghaddam et al. | 382/228 |
| 5,862,519 A | * | 1/1999 | Sharma et al. | 704/231 |
| 6,058,205 A | * | 5/2000 | Bahl et al. | 382/159 |
| 6,064,958 A | * | 5/2000 | Takahashi et al. | 704/243 |
| 6,073,096 A | * | 6/2000 | Gao et al. | 704/245 |
| 6,253,179 B1 | * | 6/2001 | Beigi et al. | 704/243 |
| 6,272,449 B1 | * | 8/2001 | Passera | 703/2 |
| 6,343,267 B1 | * | 1/2002 | Kuhn et al. | 704/222 |
| 6,442,519 B1 | * | 8/2002 | Kanevsky et al. | 704/243 |
| 2003/0046253 A1 | * | 3/2003 | Shetty et al. | 706/1 |
| 2003/0224344 A1 | * | 12/2003 | Shamir et al. | 435/4 |

OTHER PUBLICATIONS

Y. Linde et al., "An Algorithm for Vector Quantizer Design", IEEE Trans. Communication, vol. 28, pp. 84-95, Jan. 1980.
U.V. Chaudhari et al., "Transformation Enhanced Multi-Grained Modeling for Text-Independent Speaker Recognition", ICSLP 2000, pp. II-298-II-301.

* cited by examiner

*Primary Examiner*—Richemond Dorvil
*Assistant Examiner*—Qi Han
(74) *Attorney, Agent, or Firm*—Ference & Associates LLC

(57) ABSTRACT

Methods and arrangements for facilitating data clustering. From a set of input data, a predetermined number of non-overlapping subsets are created. The input data is split recursively to create the subsets.

19 Claims, 2 Drawing Sheets

US 7,472,062 B2

EFFICIENT RECURSIVE CLUSTERING BASED ON A SPLITTING FUNCTION DERIVED FROM SUCCESSIVE EIGEN-DECOMPOSITIONS

FIELD OF THE INVENTION

The present invention relates generally to data clustering, and to methods and arrangements for facilitating the same, such as in the context of enrolling target speakers in a speaker verification system. The present invention relates more particularly to the partitioning of a set of multidimensional data points into classes.

BACKGROUND OF THE INVENTION

It is generally desired that the classes, when modeled with Gaussian densities for example, can be used to construct a probability density for the data. Additional data obtained in the same way as the original set should be judged highly likely according to the constructed density. Clustering is a fundamental data analysis tool and is the basis for many approaches to pattern recognition. Among other things, this process facilitates analyzing the areas of the data space that are the most concentrated with points, while allowing one to determine which points may be outliers (i.e., data points that result from noise and do not give information about the process or system being modeled). It also forms the basis for a compact representation of the data.

Clustering is usually a very time consuming process requiring many iterative passes over the data. Generally, the clustering problem is handled by a clustering technique such as K-means or LBG (see Y. Linde, A. Buzo, R. M. Gray, "An Algorithm for Vector Quantizer Design," IEEE Trans. Commun., vol. 28, pp.84-95, January 1980). K-means starts with an initial seed of classes and iteratively re-clusters and re-estimates the centroids. The effectiveness of this method depends on the quality of the seed. LBG does not require a seed, but starts with one cluster for all of the data. Then, it uses a random criterion to generate new centroids based on the current set (initially one). K-means is used after constructing the new set of centroids. The process is repeated on the new set. In K-means, the requirement for a good seed is strong, which means one needs a lot of prior information. The iterative reclusterings are also time consuming. LBG has a random component which makes it potentially unstable in the sense that quite different models can result from two independent LBG clusterings of the same data.

In view of the foregoing, a need has been recognized in connection with improving upon the shortcomings and disadvantages associated with conventional data clustering methods and arrangements.

SUMMARY OF THE INVENTION

In accordance with at least one presently preferred embodiment of the present invention, clustering problems are solved in an efficient, deterministic manner with a recursive procedure to be discussed below.

In summary, the present invention provides, in one aspect, an apparatus for facilitating data clustering, the apparatus comprising: an arrangement for obtaining input data; and an arrangement for creating a predetermined number of non-overlapping subsets of the input data; the arrangement for creating a predetermined number of non-overlapping subsets being adapted to split the input data recursively.

In another, aspect, the present invention provides a method of facilitating data clustering, the method comprising the steps of: obtaining input data; and creating a predetermined number of non-overlapping subsets of the input data; step of creating a predetermined number of non-overlapping subsets comprising splitting the input data recursively.

Furthermore, the present invention provides, in an additional aspect, a program storage device readable by machine, tangibly embodying a program of instructions executable by the machine to perform method steps for facilitating data clustering, the method comprising the steps of: obtaining input data; and creating a predetermined number of non-overlapping subsets of the input data; step of creating a predetermined number of non-overlapping subsets comprising splitting the input data recursively.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

A recursive procedure for solving clustering problems, in accordance with at least one presently preferred embodiment of the present invention, is discussed herebelow.

Figure 1:
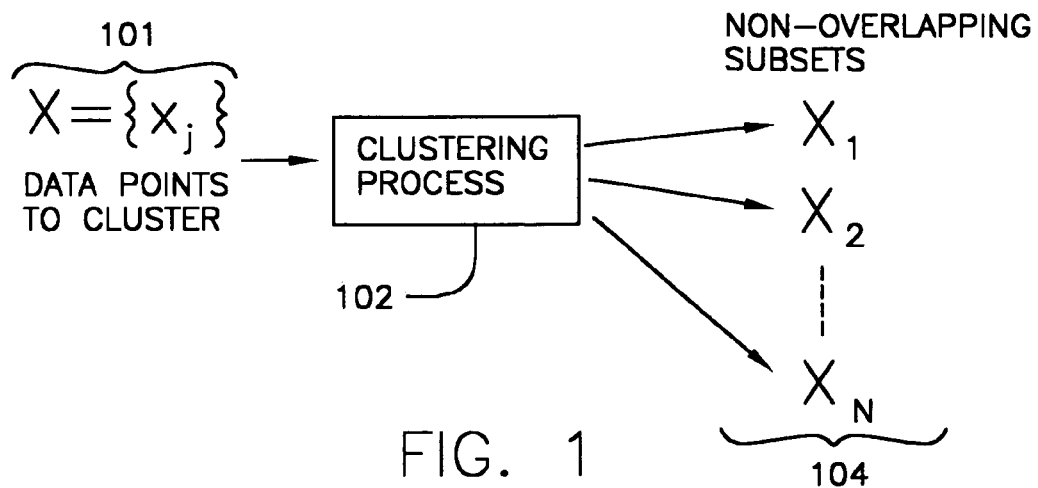
FIG. 1 schematically illustrates a general clustering operation.

With reference to FIG. 1, Let $X=\{x_i\}$ be the set of points 101 to cluster in a real n dimensional space. Thus each $x_i$ is a vector of n real numbers.

$$x_i = \{r_1, r_2, \ldots, r$$

Figure 2:
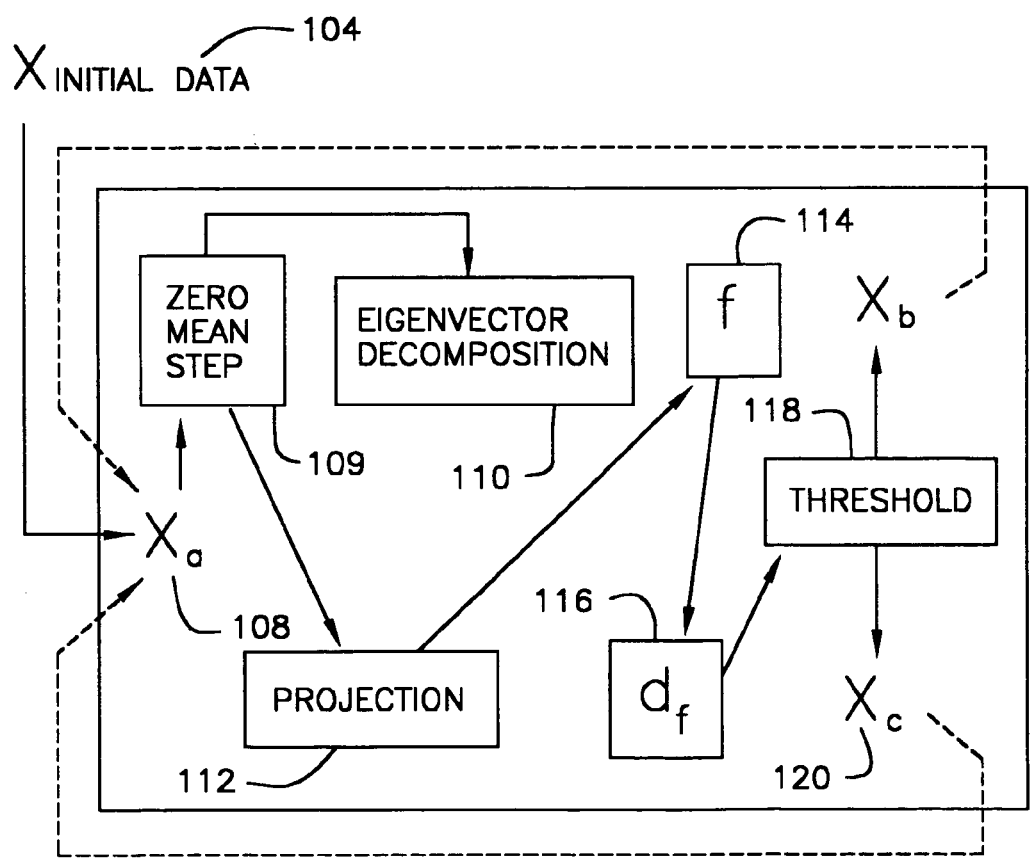
FIG. 2 schematically illustrates a splitting procedure.

As shown in FIG. 1, the goal of the clustering process 102 is generally to create N non-overlapping subsets $X_1, X_2, \ldots, X_N$ of the original data X (indicated at 104). To this end, the following splitting procedure (with reference to FIG. 2) is preferably applied recursively to the data 104 in accordance with an embodiment of the present invention:

Define $X_a$ (108) to be the input and $X_b$ and $X_c$ to be the outputs (118/120).

Compute (109) $m_a$=the mean of $X_a$ and for every $x_1$ in $X_a$, subtract out this mean. Thus the input data will now be "zero mean". Denote the resulting set of vectors by $X_a'$.

Compute the eigenvector decomposition of $X_a'$ (110) and let $e_1, e_2, \ldots, e_n$ be the eigenvectors arranged in order of decreasing eigenvalue magnitudes.

For each vector $x_1'$ in $X_a'$, compute (112) the vector of projection coefficients onto the set of eigenvectors $e_1, e_2, \ldots, e_n$:

$$x_i' \to \{<x_i', e_1>, <x_i', e_2>, \ldots, <x_i', e_n>\} = \{c_1, c_2,$$

where <,> indicates dot product.

Let $f(\{c_1, c_2, \ldots, c_n\})$ be a (non)linear function of the projection coefficients with real valued output (indicated at 114).

Let $d_f$ be the probability density of f (indicated at 116).

Define $t_0$ to be the value of f for which $d_f=\frac{1}{2}$. This is indicated as "threshold" (118) in FIG. 2. (Though here a "2-way" split of data is contemplated with a threshold of ½, it should be understood that other and/or more thresholds could be chosen to split the data into essentially any number of N subsets with N−1 thresholds. Thus, for example, if a "3-way" split of data is contemplated, then thresholds could be chosen at $d_j=\frac{1}{3}$ and $d_j=\frac{2}{3}$. Accordingly, for N subsets, there will be N−1 thresholds whose values are m/N, with m being an integer number from 1 to N−1.)

Define $X_b$ and $X_c$ (118/120) as follows:

$$X_b = \{x_i : f(\{c_1, c_2, \ldots, c_n\}_i)\}$$

$$X_c = \{x_i : f(\{c_1, c_2, \ldots, c_n\}_i)\}$$

The clustering is preferably initialized with $X_a=X$. After $X_a$ is split into $X_b$ and $X_c$, each of these in turn becomes the input to the procedure. Thus $X_b$ and $X_c$ are split in the same way each into two subsets. The procedure is repeated until the desired number of subsets are created. These splitting procedures are illustrated schematically in FIG. 3. (The individual splitting procedures ["SP"] are indicated at 122.)

Among the advantages of the method presented hereinabove are the following:

There is no variability due to randomness, as the clustering is completely deterministic. This is important when it is required that multiple clusterings of identical data result in the same final classes.

The splitting procedure seeks maximum separability, based on an eigenvector analysis.

There is no need for an initial seed, such as (for example) the one needed in K-means clustering.

Greater speed results. Since there is no requirement for an iterative reclustering procedure, the method can be performed very quickly. Experimentation has shown that, in comparison with LGB, performance is never compromised and, in fact, is often enhanced.

Figure 3:
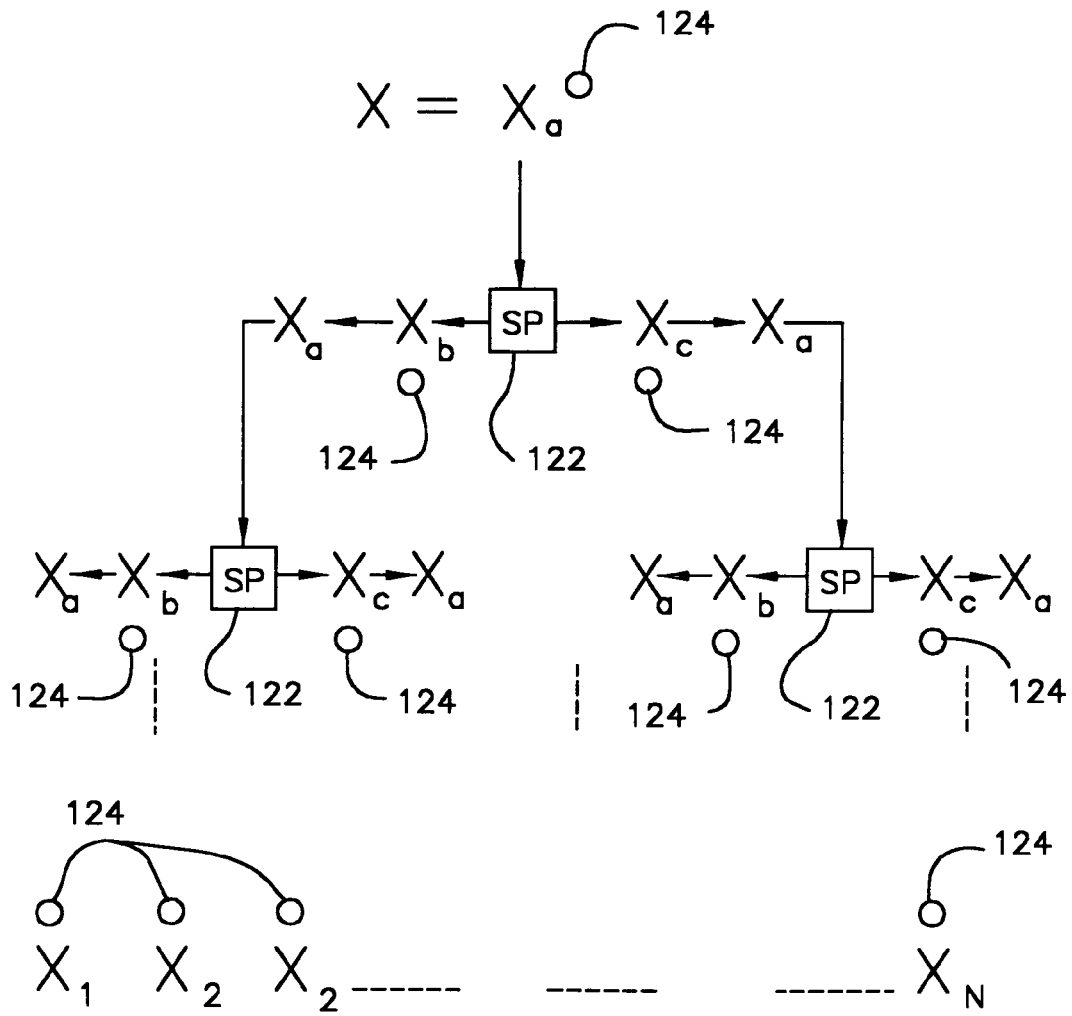
FIG. 3 schematically illustrates a tree of splits.

Each node (124) in the tree shown in FIG. 3 represents a class of data. Statistical models may now (once all of the splitting is complete) be built for each of these classes using any desired technique. The resulting models can be used for pattern classification.

A practical application of the techniques discussed and contemplated herein is in the enrollment of target speakers in a speaker verification system. In this case, if it is desired that models be built as quickly as possible, then the techniques described and contemplated herein can speed up training time by a significant order of magnitude. An example of a speaker verification system that may readily employ the embodiments of the present invention is discussed in U. V. Chaudhari, J. Navratil, S. H. Maes, and Ramesh Gopinath, "Transformation Enhanced Multi-Grained Modeling for Text-Independent Speaker Recognition", ICSLP 2000, pp. II.298-II.301.

It is to be understood that the present invention, in accordance with at least one presently preferred embodiment, includes an arrangement for obtaining input data; and an arrangement for creating a predetermined number of non-overlapping subsets of the input data, which together may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for enrollment of a speaker in a speaker verification system comprising:

an arrangement for obtaining speech and audio data as input data; and an arrangement for clustering of said speech and audio data, said arrangement for clustering further comprising:

an arrangement for creating a predetermined number of non-overlapping subsets of the input data;

said arrangement for creating a predetermined number of non-overlapping subsets by splitting the input data recursively, wherein said arrangement for creating a predetermined number of non-overlapping subsets determines an eigenvector decomposition relating to the input data;

said clustering being independent of any model wherein the splitting of the input data into a predetermined number of non-overlapping subsets occurs independent of a model;

wherein there is no variability in the clustering due to randomness.

2. The apparatus according to claim 1, wherein said arrangement for creating a predetermined number of non-overlapping subsets splits the input data into at least two sets of output data.

3. The apparatus according to claim 2, wherein said arrangement for creating a predetermined number of non-overlapping subsets:

splits the at least two sets of output data recursively; and repeats the recursive splitting of output data sets until the predetermined number of non-overlapping subsets is obtained.

4. The apparatus according to claim 2, wherein said arrangement for creating a predetermined number of non-overlapping subsets determines a vector of projection coefficients onto the set of eigenvectors in the eigenvector decomposition.

5. The apparatus according to claim 4, wherein said arrangement for creating a predetermined number of non-overlapping subsets determines a probability distribution relating to the vector of projection coefficients.

6. The apparatus according to claim 5, wherein said arrangement for creating a predetermined number of non-overlapping subsets:

assigns at least one threshold relating to the probability distribution; and yields the at least two sets of output data based on the relation to the threshold of a value associated with a function relating to the projection coefficients.

7. The apparatus according to claim 6, wherein there are N−1 thresholds, where N is the number of sets of output data to be yielded.

8. The apparatus according to claim 7, wherein each threshold is a value of the function relating to the projection coefficients for which the probability distribution equals m/N, where m is a number from 1 to N−1.

9. The apparatus according to claim 1, further comprising:
an arrangement for, after the splitting of the input data is complete, building a statistical model for pattern classification for each of the classes using any desired technique.

10. A method for enrollment of a speaker in a speaker verification system comprising:
obtaining speech and audio data as input data; and
clustering of said speech and audio data, said clustering further comprising:
creating a predetermined number of non-overlapping subsets of the input data;
said step of creating a predetermined number of non-overlapping subsets comprising splitting the input data recursively, wherein said splitting step comprises determining an eigenvector decomposition relating to the input data;
said clustering being independent of any model wherein the splitting of the input data into a predetermined number of non-overlapping subsets occurs independent of a model;
wherein there is no variability in the clustering due to randomness.

11. The method according to claim 10, wherein said splitting step comprises initially splitting the input data into at least two sets of output data.

12. The method according to claim 11, wherein said splitting step comprises:
splitting the at least two sets of output data recursively; and
repeating the recursive splitting of output data sets until the predetermined number of non-overlapping subsets is obtained.

13. The method according to claim 11, wherein said splitting step further comprises determining a vector of projection coefficients onto the set of eigenvectors in the eigenvector decomposition.

14. The method according to claim 13, wherein said splitting step further comprises determining a probability distribution relating to the vector of projection coefficients.

15. The method according to claim 14, wherein said splitting step further comprises:
assigning at least one threshold relating to the probability distribution; and
yielding the at least two sets of output data based on the relation to the threshold of a value associated with a function relating to the projection coefficients.

16. The method according to claim 15, wherein there are N−1 thresholds, where N is the number of sets of output data to be yielded.

17. The method according to claim 16, wherein each threshold is a value of the function relating to the projection coefficients for which the probability distribution equals m/N, where m is a number from 1 to N−1.

18. The method according to claim 10, wherein, after splitting of the input data is complete, building a statistical model for pattern classification for each of the classes using any desired technique.

19. A program storage device readable by machine, for enrollment of a speaker in a speaker verification system tangibly embodying a program of instructions executable by the machine to perform method steps for facilitating clustering of speech and audio data, said method comprising the steps of:
obtaining speech and audio data as input data; and
clustering of said speech and audio data, said clustering further comprising:
creating a predetermined number of non-overlapping subsets of the input data;
said step of creating a predetermined number of non-overlapping subsets comprising splitting the input data recursively, wherein said splitting step comprises determining an eigenvector decomposition relating to the input data;
said clustering being independent of any model wherein the splitting of the input data into a predetermined number of non-overlapping subsets occurs independent of a model;
wherein there is no variability in the clustering due to randomness.

* * * * *